(12) United States Patent
Takahama et al.

(10) Patent No.: US 11,280,062 B2
(45) Date of Patent: Mar. 22, 2022

(54) DISPLAY SYSTEM, DISPLAY METHOD, AND DISPLAY DEVICE

(71) Applicant: Komatsu Ltd., Tokyo (JP)

(72) Inventors: Kazuhisa Takahama, Tokyo (JP); Yukinori Matsumura, Tokyo (JP)

(73) Assignee: Komatsu Ltd., Tokyo (JP)

( * ) Notice: Subject to any disclaimer, the term of this patent is extended or adjusted under 35 U.S.C. 154(b) by 299 days.

(21) Appl. No.: 16/482,822

(22) PCT Filed: Jun. 26, 2018

(86) PCT No.: PCT/JP2018/024242
§ 371 (c)(1),
(2) Date: Aug. 1, 2019

(87) PCT Pub. No.: WO2019/054003
PCT Pub. Date: Mar. 21, 2019

(65) Prior Publication Data
US 2020/0240110 A1    Jul. 30, 2020

(30) Foreign Application Priority Data
Sep. 15, 2017    (JP) .............................. JP2017-178315

(51) Int. Cl.
*E02F 9/20*     (2006.01)
*B60R 1/00*    (2006.01)
*E02F 5/14*     (2006.01)

(52) U.S. Cl.
CPC ............... *E02F 9/205* (2013.01); *B60R 1/00* (2013.01); *E02F 5/145* (2013.01);
(Continued)

(58) Field of Classification Search
None
See application file for complete search history.

(56) References Cited

U.S. PATENT DOCUMENTS

2008/0181488 A1*  7/2008  Ishii ...................... B60R 1/00
                                                                    382/154
2013/0182066 A1*  7/2013  Ishimoto ................ E02F 9/261
                                                                     348/38
(Continued)

FOREIGN PATENT DOCUMENTS

JP          2008-144379 A       6/2008
JP          2013-168776 A       8/2013
(Continued)

OTHER PUBLICATIONS

International Search Report dated Sep. 11, 2018, issued for PCT/JP2018/024242.

*Primary Examiner* — Rebecca A Volentine
(74) *Attorney, Agent, or Firm* — Locke Lord LLP

(57) ABSTRACT

A display device has a display screen that displays a real image captured by an image capture device mounted in a construction machine which includes working equipment, and a combined image obtained by overlapping an object image indicating a virtual viewpoint image of an object around the construction machine viewed from a virtual viewpoint of an outside of the construction machine and a construction machine image indicating a virtual viewpoint image of the construction machine viewed from the virtual viewpoint, wherein the display device displays the combined image simultaneously with the real image in a partial region of the real image displayed in the display screen.

5 Claims, 11 Drawing Sheets

(52) U.S. Cl.
CPC ... *B60R 2300/302* (2013.01); *B60R 2300/304* (2013.01); *B60R 2300/60* (2013.01); *B60Y 2200/412* (2013.01)

(56) References Cited

U.S. PATENT DOCUMENTS

| | | | | |
|---|---|---|---|---|
| 2013/0222573 | A1* | 8/2013 | Onuma | H04N 7/18 348/82 |
| 2015/0343976 | A1* | 12/2015 | Lim | G01S 15/931 340/435 |
| 2017/0254050 | A1* | 9/2017 | Wright | H04N 7/18 |
| 2018/0051446 | A1 | 2/2018 | Yoshinada et al. | |
| 2019/0211532 | A1* | 7/2019 | Sakamoto | B60R 1/00 |

FOREIGN PATENT DOCUMENTS

| | | |
|---|---|---|
| JP | 2016-089388 A | 5/2016 |
| JP | 2016-160741 A | 9/2016 |
| WO | 2017/042873 A1 | 3/2017 |

\* cited by examiner

DISPLAY SYSTEM, DISPLAY METHOD, AND DISPLAY DEVICE

FIELD

The present invention relates to a display system, a display method, and a display device.

BACKGROUND

A technique has been known in which a construction machine is operated at a remote distance. In a case where the construction machine is operated at a remote distance, a work place is captured by an image capture device. An image of the work place captured by the image capture device is displayed in a display device provided in a remote operation facility. An operator operates a remote operation device while watching the image of the work place displayed in the display device.

Patent Literature 1 discloses a technique in which the work place is captured by a camera installed in the construction machine and a situation of the construction machine is captured from an outside by a camera installed in the work place.

CITATION LIST

Patent Literature

Patent Literature 1: Japanese Patent Application Laid-Open No. 2013-168776 A

SUMMARY

Technical Problem

In a case where a construction machine is operated at a remote distance, and the image displayed in the display device is a two-dimensional image, the operator may hardly feel a perspective sensation of the work place. If the perspective sensation of the work place is hardly obtained, the operator is hard to measure a distance between the construction machine and an object around the construction machine. As a result, workability of the remote operation may be lowered.

Aspects of the invention are to provide a technology that the operator can comfortably operate the construction machine at a remote distance, and the degradation in workability can be suppressed.

Solution to Problem

According to an aspect of the invention, a display system, comprises: an object image generation unit which generates, on the basis of detection data of a distance detection device which is mounted in a construction machine equipped with working equipment and detects a distance to an object around the construction machine, an object image indicating a virtual viewpoint image of the object viewed from a virtual viewpoint of an outside of the construction machine; a construction machine image generation unit which generates a construction machine image indicating a virtual viewpoint image of the construction machine viewed from the virtual viewpoint on the basis of detection data of a posture detection device which is mounted in the construction machine and detects a posture of the construction machine; a synthesis unit which generates a combined image obtained by overlapping the object image and the construction machine image; and a display control unit which causes a real image captured by an image capture device mounted in the construction machine and the combined image to be displayed simultaneously in a display device located outside of the construction machine.

Advantageous Effects of Invention

According to an aspect of the invention, it is possible to provide a technology that an operator can comfortably operate a construction machine at a remote distance, and the degradation in workability can be suppressed.

DESCRIPTION OF EMBODIMENTS

Hereinafter, embodiments of the invention will be described with reference to the drawings, but the invention is not limited thereto. The components of the embodiments described below may be appropriately combined. In addition, some components may be not used.

[Outlines of Construction Machine and Remote Operation System]

Figure 1:
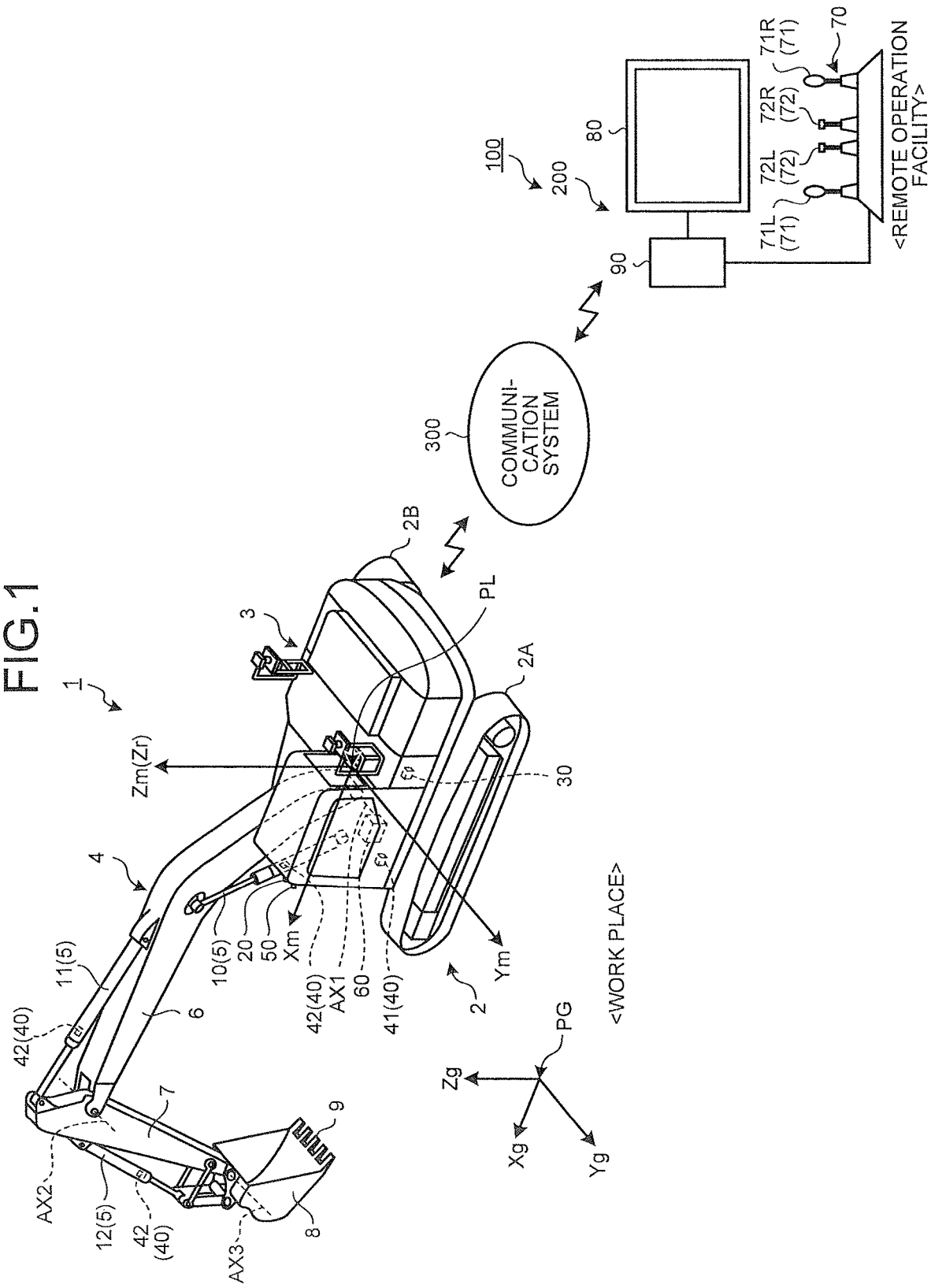
FIG. 1 is a diagram schematically illustrating an example of a remote operation system of a construction machine according to the embodiment.

FIG. 1 is a diagram schematically illustrating an example of a remote operation system 100 of a construction machine 1 according to this embodiment. The remote operation system 100 operates the construction machine 1 at a remote distance. In this embodiment, the construction machine 1 is an excavator. In the following description, the construction machine 1 will be appropriately called the excavator 1.

The excavator 1 includes a traveling body 2, a swing body 3, working equipment 4, a hydraulic cylinder 5, a distance detection device 20, a position detection device 30, a posture detection device 40, an image capture device 50, and a control device 60. The excavator 1 is in a work place, and works in the work place.

In this embodiment, a coordinate system (Xm-Ym-Zm coordinate system) of the vehicle is defined for the swing body 3. The coordinate system of the vehicle is a three-dimensional coordinate system representing a relative position with respect to an origin PL defined in the swing body 3. The coordinate system of the vehicle is defined by an Xm axis of a first reference plane based on the origin PL, a Ym axis perpendicular to the Xm axis in the first reference plane, and a Zm axis perpendicular to the first reference plane. A direction parallel to the Xm axis is set to an Xm axis direction, a direction parallel to the Ym axis is set to a Ym axis direction, and a direction parallel to the Zm axis direction is set to a Zm axis direction. The Xm axis direction is a front-back direction of the swing body 3, the Ym axis direction is a right-left direction of the swing body 3, and the Zm axis direction is an upward-downward direction of the swing body 3.

The traveling body 2 includes crawler belts 2A and 2B. When the crawler belts 2A and 2B rotate, the excavator 1 travels. The Zm axis of the coordinate system of the vehicle is perpendicular to a grounding surface of the crawler belts 2A and 2B. A +Zm direction of the coordinate system of the vehicle is an upward direction of the swing body 3, and away from the grounding surface of the crawler belts 2A and 2B. A −Zm direction of the coordinate system of the vehicle is a downward direction of the swing body 3, and is opposite to the +Zm direction.

The swing body 3 is rotatably supported to the traveling body 2. The swing body 3 is rotatable about a swing axis Zr. The swing axis Zr is in parallel to the Zm axis of the coordinate system of the vehicle. The origin PL of the coordinate system of the vehicle is defined at the center of a swing circle of the swing body 3. The center of the swing circle is located in the swing axis Zr of the swing body 3.

The working equipment 4 is supported to the swing body 3. In the coordinate system of the vehicle, at least a part of the working equipment 4 is disposed in a +Xm direction from the swing body 3. The +Xm direction of the coordinate system of the vehicle is a front direction of the swing body 3, and is a direction where a tip portion 9 of the working equipment 4 exists with the swing body 3 as a reference. A −Xm direction of the coordinate system of the vehicle is a backward direction of the swing body 3, and is opposite to the +Xm direction.

The working equipment 4 includes a boom 6 connected to the swing body 3, an arm 7 connected to the boom 6, and a bucket 8 connected to the arm 7. The tip portion 9 of the working equipment 4 includes a blade of the bucket 8. Further, the tip portion 9 of the working equipment 4 may be the tip portion of the blade of the bucket 8.

The hydraulic cylinder 5 generates power to drive the working equipment 4. The hydraulic cylinder 5 generates a driving power by operating fluid supplied from a hydraulic pump. The hydraulic cylinder 5 includes a boom cylinder 10 which drives the boom 6, an arm cylinder 11 which drives the arm 7, and a bucket cylinder 12 which drives the bucket 8.

The boom 6 is rotatably connected to the swing body 3 about a rotation axis AX1. The arm 7 is rotatably connected to the tip portion of the boom 6 about the rotation axis AX2. The bucket 8 is rotatably connected to the tip portion of the arm 7 about the rotation axis AX3. The rotation axis AX1 of the boom 6, the rotation axis AX2 of the arm 7, and the rotation axis AX3 of the bucket 8 are in parallel to the Ym axis of the coordinate system of the vehicle. A +Ym direction of the coordinate system of the vehicle is a left direction of the swing body 3. A −Ym direction of the coordinate system of the vehicle is a direction opposite to the +Ym direction, and is a right direction of the swing body 3.

The distance detection device 20 is mounted in the excavator 1. The distance detection device 20 detects a distance Ld to an object WA in the surrounding area of the excavator 1 (see FIG. 6).

Examples of the object WA include a construction target to be constructed in the work place, the ground, at least a part of the working equipment 4 located in the front direction from the swing body 3, a structure, a construction machine different from the excavator 1, and at least a part of a transport vehicle which carries a load stacked by the excavator 1.

In this embodiment, the distance detection device 20 includes a laser range finder. The distance detection device 20 includes a light emitting unit which emits a laser beam (detection beam), and a light receiving unit which receives a laser beam reflected on the object WA. The distance detection device 20 is provided in the upper portion of the swing body 3. The light receiving unit of the distance detection device 20 faces in the front direction of the swing body 3 (+Xm direction). The distance detection device 20 detects the distance Ld to the object WA in the front direction of the swing body 3. Detection data of the distance detection device 20 is output to the control device 60.

The position detection device 30 is mounted in the excavator 1. The position detection device 30 detects a position Pa of the swing body 3 of the excavator 1 in a global coordinate system (Xg-Yg-Zg coordinate system). The global coordinate system is a three-dimensional coordinate system which is based on an origin PG defined in the earth, and is a coordinate system representing an absolute position defined by a global navigation satellite system (GNSS) such as a global positioning system (GPS). The position detection device 30 is provided in the swing body 3. The position detection device 30 detects the position Pa of the swing body 3 using the GNSS. Detection data of the position detection device 30 is output to the control device 60.

The posture detection device 40 is mounted in the excavator 1. The posture detection device 40 detects a posture of the excavator 1. The posture of the excavator 1 includes the posture of the swing body 3 and the posture of the working equipment 4. The posture of the swing body 3 includes an inclination angle of the swing body 3. The posture of the working equipment 4 includes an inclination angle of the working equipment 4. The posture detection device 40 includes a swing body posture sensor 41 which detects the posture of the swing body 3 and working equipment posture sensor 42 which detects the posture of the working equipment 4. Detection data of the posture detection device 40 is output to the control device 60.

In this embodiment, the swing body posture sensor 41 includes an inertial measurement unit (IMU) provided in the swing body 3. The working equipment posture sensor 42 includes a stroke sensor which detects a cylinder stroke indicating an operation amount of the hydraulic cylinder 5.

The image capture device 50 is mounted in the excavator 1. The image capture device 50 captures the object WA in the surrounding area of the excavator 1, and acquires the image of the object WA. The image capture device 50 includes an optical system and an image sensor which receives the light passing through the optical system. The image sensor includes a couple charged device (CCD) image sensor or a complementary metal oxide semiconductor (CMOS) image sensor.

In this embodiment, the image capture device 50 is a monocular camera. The image capture device 50 is provided in the upper portion of the swing body 3. An incident surface of the optical system of the image capture device 50 faces the front direction (+Xm direction) of the swing body 3. The image capture device 50 acquires the image of the object WA in the front direction of the swing body 3. In this embodiment, the image capture device 50 can acquire at least a part of the image of the working equipment 4 located in the front direction from the swing body 3. The image data of the object WA of acquired by the image capture device 50 is output to the control device 60.

In the following description, the image acquired by the image capture device 50 will be appropriately called a real image RG. The real image RG indicates an actual image of the work place captured by the image capture device 50. The real image RG is a two-dimensional image.

The remote operation system 100 includes a remote operation device 70 which is provided in a remote operation facility located outside of the excavator 1 and a display system 200 which causes the image of the object WA existing in the work place to be displayed in the remote operation facility.

The display system 200 includes a display device 80 located outside of the excavator 1 and a control device 90 which is in the outside of the excavator 1 and communicates with the excavator 1. The remote operation device 70, the display device 80, and the control device 90 each are provided in the remote operation facility. The remote operation device 70, the display device 80, and the control device 90 each are provided separately from the excavator 1.

The control device 60 mounted in the excavator 1 and the control device 90 provided in the remote operation facility communicate through a communication system 300. The communication system 300 may communicate in a wired or wireless manner. The communication system 300 includes at least one of the Internet, a local area network (LAN), a mobile phone network, and a satellite network.

The excavator 1 is remotely operated by the remote operation device 70. The remote operation device 70 includes a working lever 71 which remotely operates the swing body 3 and the working equipment 4 of the excavator 1 and a traveling lever 72 which remotely operates the traveling body 2. An operator operates the remote operation device 70 in the remote operation facility. An operation signal generated when the remote operation device 70 is operated is transmitted to the control device 60 through the communication system 300. The control device 60 outputs a control signal to control the swing body 3, the working equipment 4, and the traveling body 2 on the basis of the operation signal. With this configuration, the excavator 1 is remotely operated.

The working lever 71 includes a left working lever 71L and a right working lever 71R which are operated to operate the swing body 3 and the working equipment 4. The traveling lever 72 includes a left traveling lever 72L and a right traveling lever 72R which are operated to operate the traveling body 2.

[Construction Machine]

Figure 2:
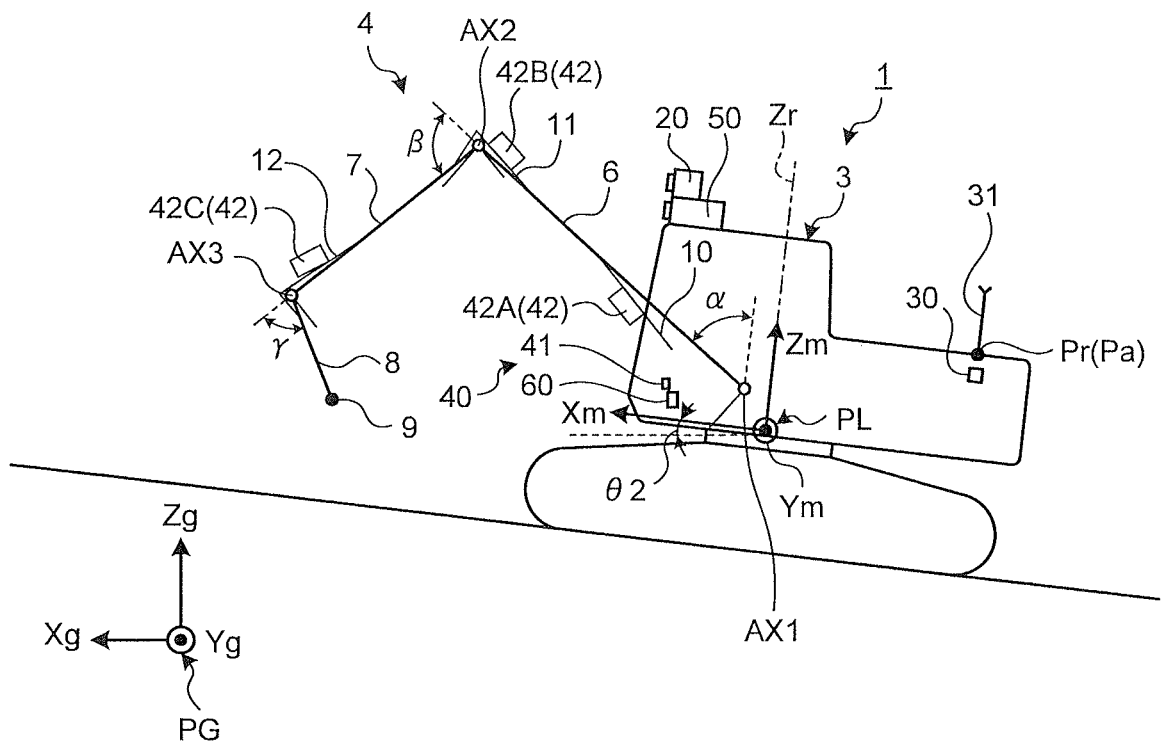
FIG. 2 is a side view schematically illustrating the construction machine according to the embodiment.
Figure 3:
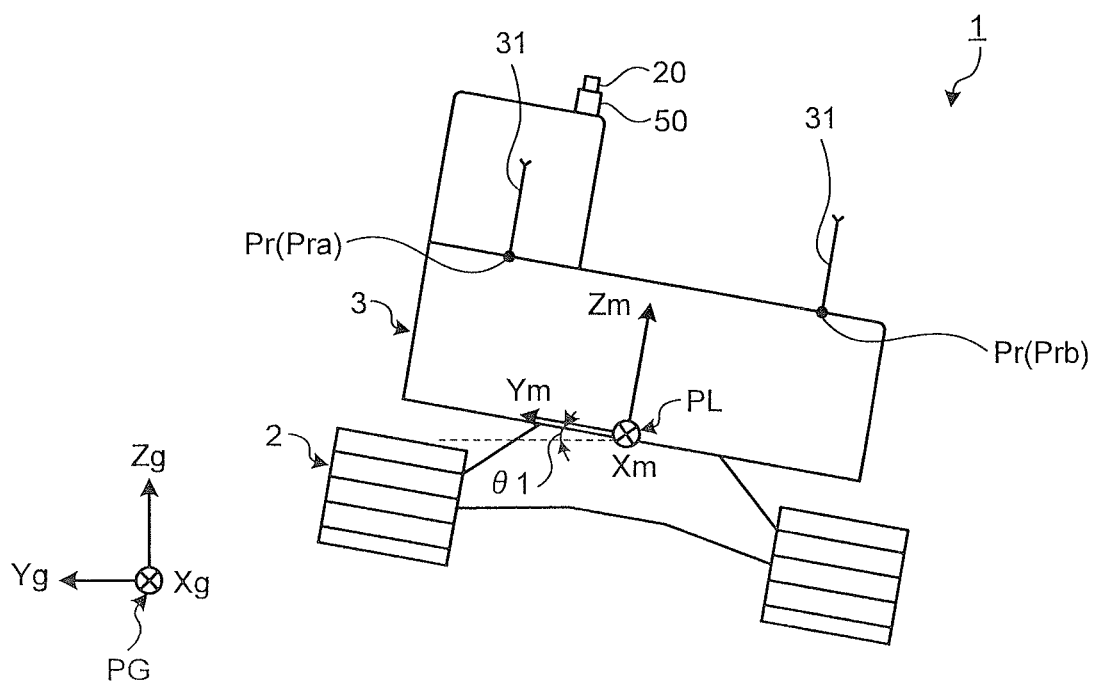
FIG. 3 is a rear view schematically illustrating the construction machine according to the embodiment.
Figure 4:
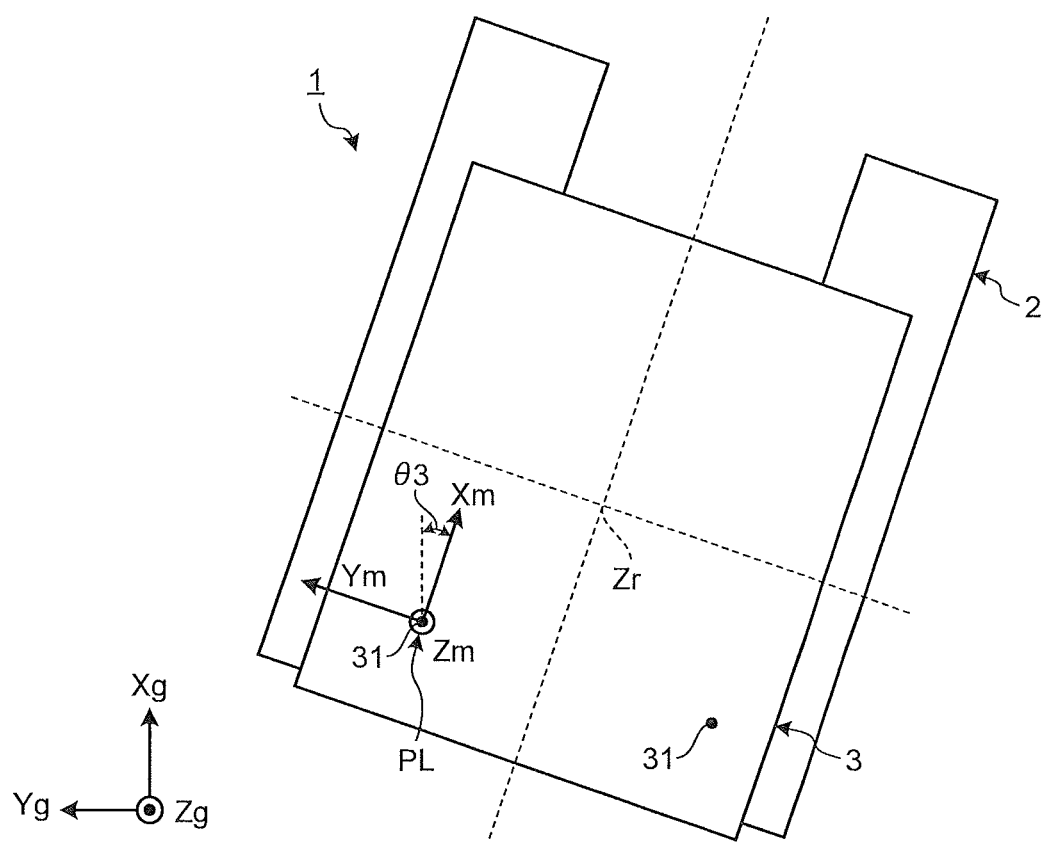
FIG. 4 is a top view schematically illustrating the construction machine according to the embodiment.

FIG. 2 is a side view schematically illustrating the excavator 1 according to this embodiment. FIG. 3 is a rear view schematically illustrating the excavator 1 according to this embodiment. FIG. 4 is a top view schematically illustrating the excavator 1 according to this embodiment.

As illustrated in FIGS. 2, 3, and 4, the excavator 1 includes the distance detection device 20, the position detection device 30, the posture detection device 40 which includes the swing body posture sensor 41 and the working equipment posture sensor 42, the image capture device 50, and the control device 60.

A plurality of GPS antennas 31 are provided in the swing body 3. The GPS antenna 31 receives radio waves from a GPS satellite, and outputs a signal generated on the basis of the received radio waves to the position detection device 30. The position detection device 30 detects a position Pr which is defined in the global coordinate system and at which the GPS antenna 31 is located on the basis of the signal from the GPS antenna 31. The position detection device 30 detects the position Pa of the swing body 3 in the global coordinate system on the basis of the position Pr where the GPS antenna 31 is installed.

Two GPS antennas 31 are provided in the right-left direction. The position detection device 30 detects a position Pra where one GPS antenna 31 is provided and a position Prb where the other GPS antenna 31 is provided. The position detection device 30 performs an arithmetic processing on the basis of at least one of the position Pra and the position Prb, and detects the position Pa of the swing body 3 in the global coordinate system. In this embodiment, the position Pa of the swing body 3 is the position Pra. Further, the position Pa of the swing body 3 may be the position Prb, or may be a position between the position Pra and the position Prb.

The swing body posture sensor 41 includes an inertial measurement unit (IMU). The swing body posture sensor 41 detects the inclination angle of the swing body 3 with respect to an Xg-Yg plane (horizontal plane) defined in the global coordinate system. The inclination angle of the swing body 3 includes a roll angle $\theta 1$ indicating the inclination angle of the swing body 3 in the right-left direction with respect to the horizontal plane, a pitch angle $\theta 2$ indicating the inclination angle of the swing body 3 in the front-back direction with respect to the horizontal plane, and a yaw angle $\theta 3$ indicating the inclination angle of the swing body 3 in the rotation direction about the Zm axis. The roll angle $\theta 1$, the pitch angle $\theta 2$, and the yaw angle $\theta 3$ are calculated by integrating the angular speed detected by the inertial measurement unit with time. When the swing body 3 is swung, the yaw angle $\theta 3$ varies. In a case where the swing body 3 is swung in a state where the traveling body 2 is stopped, the yaw angle $\theta 3$ corresponds to the swing angle of the swing body 3.

The posture of the swing body 3 includes at least one of the roll angle $\theta 1$, the pitch angle $\theta 2$, and the yaw angle $\theta 3$.

Further, the yaw angle $\theta 3$ may be detected by the position detection device 30. The position detection device 30 can detect an azimuth of the swing body 3 with respect to a reference azimuth in the global coordinate system on the basis of the position Pra of the one GPS antenna 31 and the position Prb of the other GPS antenna 31. The position detection device 30 performs an arithmetic processing on the basis of the position Pra and the position Prb, and detects the azimuth of the swing body 3 with respect to the reference azimuth. An angle formed by the reference azimuth and the azimuth of the swing body 3 corresponds to the yaw angle $\theta 3$. The position detection device 30 calculates a straight line connecting the position Pra and the position Prb, and can detect the yaw angle $\theta 3$ on the basis of the angle formed by the calculated straight line and the reference azimuth.

The working equipment posture sensor 42 includes a stroke sensor. The working equipment posture sensor 42 detects the inclination angle of the working equipment 4 which is defined in the coordinate system of the vehicle. The stroke sensor includes a boom stroke sensor 42A which detects the cylinder stroke of the boom cylinder 10, an arm stroke sensor 42B which detects the cylinder stroke of the arm cylinder 11, and a bucket stroke sensor 42C which detects the cylinder stroke of the bucket cylinder 12. The control device 60 calculates an inclination angle α of the boom 6 with respect to the Zm axis of the coordinate system of the vehicle on the basis of the detection data of the boom stroke sensor 42A. The control device 60 calculates an inclination angle β of the arm 7 with respect to the boom 6 on the basis of the detection data of the arm stroke sensor 42B. The control device 60 calculates an inclination angle γ of the bucket 8 with respect to the arm 7 on the basis of the detection data of the bucket stroke sensor 42C.

The posture of the working equipment 4 includes at least one of the inclination angle α, the inclination angle β, and the inclination angle γ.

[Coordinate System]

Figure 5:
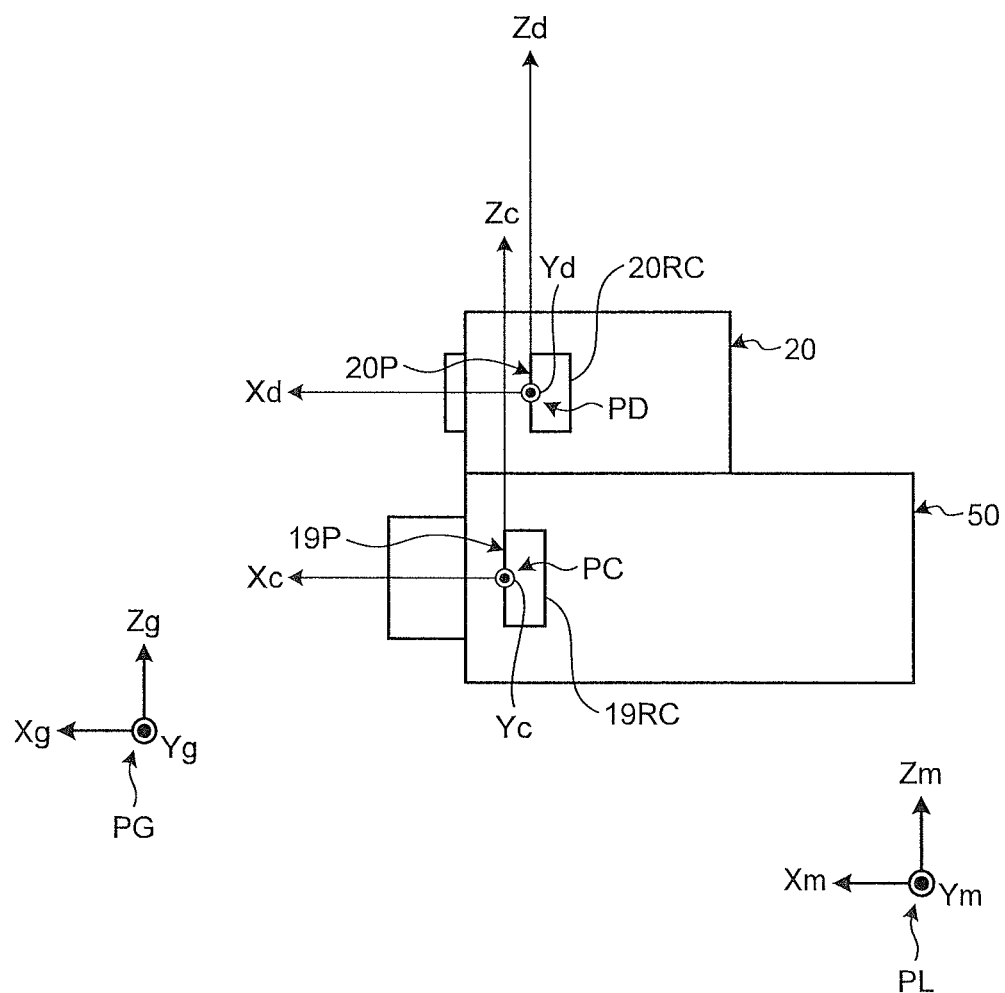
FIG. 5 is a diagram schematically illustrating a distance detection device and an image capture device according to the embodiment.

FIG. 5 is a diagram schematically illustrating the distance detection device 20 and the image capture device 50 according to this embodiment. As described above, in this embodiment, the global coordinate system (Xg-Yg-Zg coordinate system) and the coordinate system of the vehicle (Xm-Ym-Zm coordinate system) are defined.

In addition, in this embodiment, a coordinate system (Xd-Yd-Zd coordinate system) of the distance detection device and a coordinate system (Xc-Yc-Zc coordinate system) of the image capture device are defined.

The coordinate system of the distance detection device is a three-dimensional coordinate system indicating a relative position with respect to an origin PD defined in the distance detection device 20. The coordinate system of the distance detection device is defined by an Xd axis of a second reference plane based on the origin PD, a Yd axis perpendicular to the Xd axis in the second reference plane, and a Zd axis perpendicular to the second reference plane. The origin PD of the coordinate system of the distance detection device is defined at the center of a detection surface 20P of a distance detection element 20RC.

The coordinate system of the image capture device is a three-dimensional coordinate system indicating a relative position with respect to an origin PC defined in the image capture device 50. The coordinate system of the image capture device is defined by an Xc axis of a third reference plane based on the origin PC, a Yc axis perpendicular to the Xc axis in the third reference plane, and a Zc axis perpendicular to the third reference plane. The origin PC of the coordinate system of the image capture device is defined at the center of an image face 19P of an image sensor 19RC. The Xc axis passes through an optical center of the image capture device 50, and perpendicular to the image face 19P.

The relative position between the position Pa in the global coordinate system detected by the position detection device 30 and the origin PL in the coordinate system of the vehicle is, for example, given data which is derived from design data or specification data of the excavator 1. In addition, the relative position among the origin PL in the coordinate system of the vehicle, the origin PD in the coordinate system of the distance detection device, and the origin PC in the coordinate system of the image capture device is, for example, given data which is derived from the design data of the excavator 1, the design data or the specification data of the distance detection device 20, and the design data or the specification data of the image capture device 50. Therefore, the position in the global coordinate system, the position in the coordinate system of the vehicle, the position in the coordinate system of the distance detection device, and the coordinate system of the image capture device are convertible to each other.

[Distance Detection Device and Image Capture Device]

Figure 6:
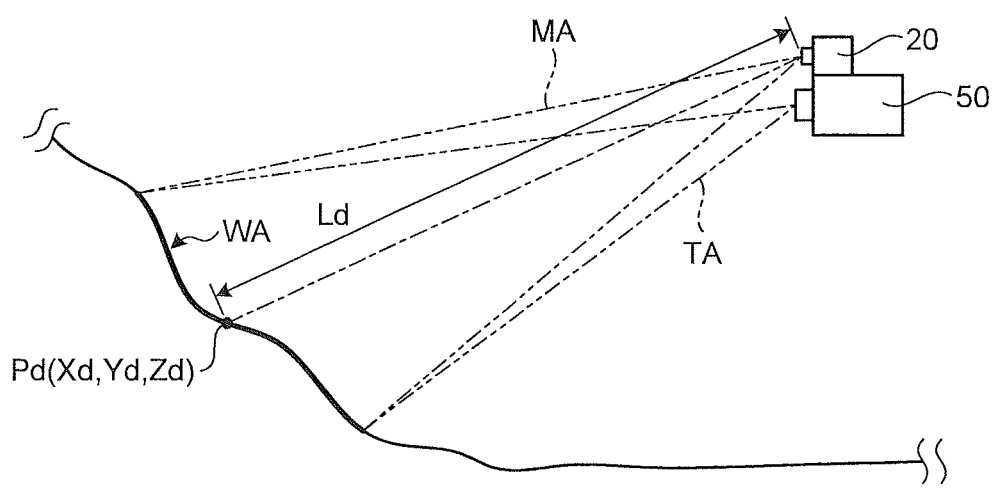
FIG. 6 is a diagram schematically illustrating an example of the distance detection device and the image capture device according to the embodiment.

FIG. 6 is a diagram schematically illustrating an example of the distance detection device 20 and the image capture device 50 according to this embodiment. FIG. 6 illustrates an example in which the object WA detected by the distance detection device 20 and captured by the image capture device 50 is the ground of the construction target.

As illustrated in FIG. 6, the distance detection device 20 includes a detection range MA. The distance detection device 20 detects the distance Ld to the object WA existing in the detection range MA. The distance Ld is a distance between the origin PD and the surface of the object WA in the coordinate system of the distance detection device.

The distance detection device 20 detects the distance Ld to the surface of the object WA to detect the position Pd of the surface of the object WA in the coordinate system of the distance detection device. The position Pd defines an azimuth and an angle with respect to the origin PD. The distance detection device 20 can detect three-dimensional coordinates (Xd, Yd, Zd) of the position Pd in the coordinate system of the distance detection device.

The distance detection device 20 detects the distance Ld to each of a plurality of portions of the surface of the object WA to detect the position Pd of each of the plurality of portions, so that a three-dimensional shape of the object WA in a distance detection coordinate system can be detected. The three-dimensional shape of the object WA is point group data of a plurality of positions Pd of which the three-dimensional coordinates (Xd, Yd, Zd) are detected.

The distance detection device 20 detects the three-dimensional shape of the object WA in the front direction of the swing body 3. In a case where the object WA is the ground, the distance detection device 20 detects the distance Ld to each of the plurality of portions of the ground, and can detect the shape of the ground in the front direction of the excavator 1.

As described above, the position in the global coordinate system, the position in the coordinate system of the vehicle, the position in the coordinate system of the distance detection device, and the position in the coordinate system of the image capture device can be convertible to each other. Therefore, the point group data at the plurality of positions Pd (Xd, Yd, Zd) defined in the coordinate system of the distance detection device is convertible to the point group data at the plurality of positions Pm (Xm, Ym, Zm) defined in the coordinate system of the vehicle, convertible to the point group data at the plurality of positions Pg (Xg, Yg, Zg) defined in the global coordinate system, and convertible to the point group data at the plurality of positions Pc (Xc, Yc, Zc) defined in the coordinate system of the image capture device. In other words, the three-dimensional shape of the object WA defined in the coordinate system of the distance detection device is convertible to the three-dimensional shape of the object WA of each of the coordinate system of the vehicle, the global coordinate system, and the coordinate system of the image capture device through conversion.

The image capture device 50 includes a capturing range TA. The image capture device 50 can acquire an image of the object WA existing in the capturing range TA. In the surface of the object WA, at least parts of the detection range MA and the capturing range TA are overlapped. The installation state of the distance detection device 20 and the installation state of the image capture device 50 with respect to the swing body 3 are adjusted to make at least parts of the detection range MA and the capturing range TA overlapped. The overlapping range of the detection range MA and the capturing range TA is desirably set as large as possible. The image capture device 50 acquires an image corresponding to each of the plurality of positions Pd. The position Pc in the image corresponding to the position Pd is defined in the coordinate system of the image capture device. When the position Pd in the three-dimensional shape of the object WA detected by the distance detection device 20 is converted to the position Pc in the coordinate system of the image capture device, the three-dimensional shape of the object WA and the image of the object WA can be overlapped in the coordinate system of the image capture device. In addition, the position Pd in the three-dimensional shape of the object WA and the position Pc in the image of the object WA can be converted to the position Pm of the coordinate system of the vehicle or the position Pg of the global coordinate system.

[Control Device]

Figure 7:
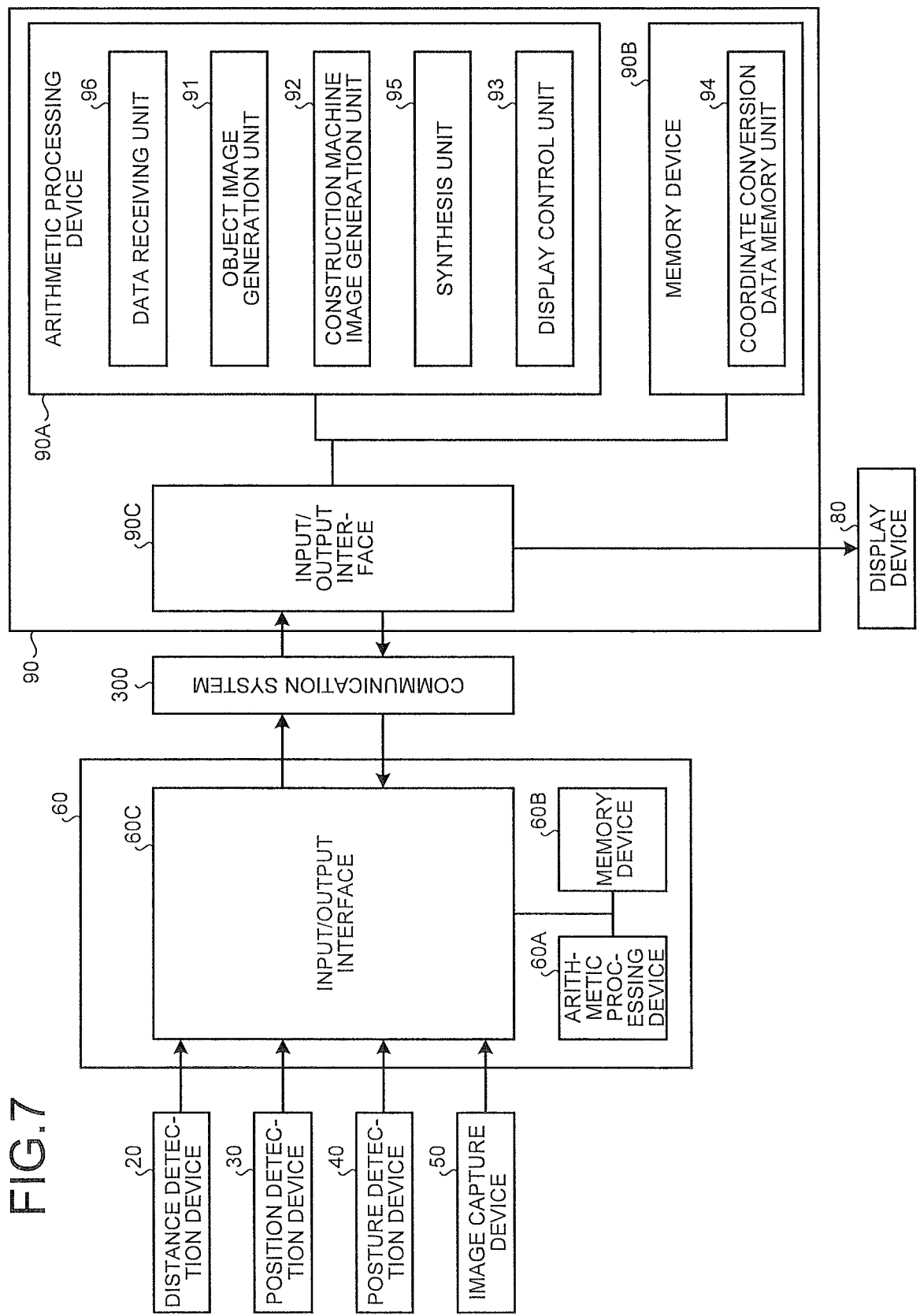
FIG. 7 is a functional block diagram illustrating an example of a control device according to the embodiment.

FIG. 7 is a functional block diagram illustrating an example of the control device 60 and the control device 90 according to this embodiment.

The control device 60 includes a computer system. The control device 60 includes an arithmetic processing device 60A which includes a processor such as a central processing unit (CPU), a memory device 60B which includes a volatile memory such as a random access memory (RAM) and a non-volatile memory such as a read only memory (ROM), and an input/output interface 60C which includes an input/output circuit capable of transmitting and receiving signals and data.

The control device 90 includes a computer system. The control device 90 includes an arithmetic processing device 90A which includes a processor such as a CPU (central processing unit), a memory device 90B which includes a volatile memory such as a RAM (random access memory) and a non-volatile memory such as a ROM (read only memory), and an input/output interface 90C which includes an input/output circuit capable of transmitting and receiving signals and data.

The display device 80 includes a flat panel display such as a liquid crystal display (LCD) or an organic electroluminescence display (OELD).

The detection data indicating the distance Ld to the object WA detected by the distance detection device 20 is output to the control device 60 in a predetermined cycle. The input/output interface 60C of the control device 60 receives the detection data of the distance detection device 20. The input/output interface 60C of the control device 60 transmits the detection data of the distance detection device 20 to the control device 90 through the communication system 300 in a predetermined cycle.

The detection data indicating the position Pa of the swing body 3 detected by the position detection device 30 is output to the control device 60 in a predetermined cycle. The input/output interface 60C of the control device 60 receives the detection data of the position detection device 30. The input/output interface 60C of the control device 60 transmits the detection data of the position detection device 30 to the control device 90 through the communication system 300 in a predetermined cycle.

The detection data indicating the posture of the excavator 1 detected by the posture detection device 40 is output to the control device 60 in a predetermined cycle. The input/output interface 60C of the control device 60 receives the detection data of the posture detection device 40. The input/output interface 60C of the control device 60 transmits the detection data of the posture detection device 40 to the control device 90 through the communication system 300 in a predetermined cycle.

The image data of the object WA captured by the image capture device 50 is output to the control device 60 in a predetermined cycle. The control device 60 of the input/output interface 60C receives the image data of the object WA captured by the image capture device 50. The control device 60 the input/output interface 60C transmits the image data of the object WA to the control device 90 through the communication system 300 in a predetermined cycle.

The control device 90 receives the detection data of the distance detection device 20, the detection data of the position detection device 30, the detection data of the posture detection device 40, and the image data of the object WA captured by the image capture device 50 through the communication system 300 in a predetermined cycle. The control device 90 generates an object image AG indicating a virtual viewpoint image of the object WA viewed from a virtual viewpoint of the outside of the excavator 1 on the basis of the detection data of the distance detection device 20 in a predetermined cycle. In addition, the control device 90 generates a construction machine image BG indicating a virtual viewpoint image of the excavator 1 viewed from a virtual viewpoint of the outside of the excavator 1 on the basis of the detection data of the posture detection device 40 in a predetermined cycle. In addition, the control device 90 generates a combined image IG obtained by overlapping the object image AG and the construction machine image BG in a predetermined cycle.

The display device 80 displays the combined image IG generated by the control device 90. The combined image IG containing the object image AG and the construction machine image BG is a computer graphic generated by the control device 90. Each of the object image AG and the construction machine image BG displayed in the display device 80 is a three-dimensional image overlooked from the virtual viewpoint of the outside of the excavator 1. In addition, the display device 80 displays the real image RG indicating an actual image of the object WA of the work place captured by the image capture device 50. The real image RG is a two-dimensional image.

The virtual viewpoint is a viewpoint which is virtually set in a virtual space simulating a real space (the work place in this embodiment). The position and the direction of the virtual viewpoint can be set arbitrarily. The virtual viewpoint image is a virtual image which is overlooked from the virtual viewpoint with a position and a direction set in the virtual space. For example, the virtual viewpoint image is a virtual image captured by the image capture device which is installed at the virtual viewpoint in the virtual space and is set with the position and the direction. The virtual viewpoint image is a computer graphic generated by the control device 90.

In this embodiment, the position of the virtual viewpoint is in the outside of the excavator 1, and set in the obliquely rising direction of the excavator 1. A facing direction of the virtual viewpoint is set to an obliquely falling direction such that the excavator 1 and the object WA surrounding the excavator 1 are looked down. The object image AG is a virtual three-dimensional image of the object WA overlooked from the virtual viewpoint in the virtual space of the work place. The construction machine image BG is a virtual three-dimensional image of the excavator 1 overlooked from the virtual viewpoint in the virtual space of the work place.

The arithmetic processing device 90A includes a data receiving unit 96, an object image generation unit 91, a construction machine image generation unit 92, a synthesis unit 95, and a display control unit 93. The memory device 90B includes a coordinate conversion data memory unit 94.

The data receiving unit 96 receives the detection data of the distance detection device 20, the detection data of the position detection device 30, the detection data of the posture detection device 40, and the image data of the image capture device 50 through the communication system 300.

The object image generation unit 91 generates the object image AG indicating the virtual viewpoint image of the object WA viewed from the virtual viewpoint of the outside of the excavator 1 in a predetermined cycle on the basis of the detection data of the distance detection device 20. The detection data of the distance detection device 20 includes the three-dimensional shape of the surface of the object WA. The object image AG is a three-dimensional image of the object WA viewed from the virtual viewpoint. The object image generation unit 91 generates the object image AG (three-dimensional image) of the object WA viewed from the virtual viewpoint on the basis of the three-dimensional shape of the object WA.

In this embodiment, the object image generation unit 91 generates the object image AG defined in the coordinate system of the distance detection device. In a case where the object image AG is a construction target (ground), the three-dimensional shape of the object WA is changed by an excavating work or a spreading and grading work in the work place. In a case where the object image AG is a transport vehicle, the three-dimensional shape or the position of the object WA is changed by a loading work or a carrying work. The object image generation unit 91 generates the object image AG in a predetermined cycle. In a case where the three-dimensional shape of the object WA is changed by the excavating work or the spreading and grading work, or the three-dimensional shape or the position of the object WA is changed by the loading work or the carrying work, the object image generation unit 91 generates the object image AG in conjunction with these changes.

The construction machine image generation unit 92 generates the construction machine image BG indicating the virtual viewpoint image of the excavator 1 viewed from the virtual viewpoint of the outside of the excavator 1 in a predetermined cycle on the basis of the detection data of the posture detection device 40. The detection data of the posture detection device 40 includes the posture of the swing body 3 of the excavator 1 and the posture of the working equipment 4. The construction machine image BG is a three-dimensional image of the excavator 1 viewed from the virtual viewpoint. The construction machine image generation unit 92 generates the construction machine image BG (three-dimensional image) of the excavator 1 viewed from the virtual viewpoint in a predetermined cycle on the basis of the posture of the swing body 3 and the posture of the working equipment 4.

In this embodiment, the construction machine image generation unit 92 generates the construction machine image BG defined in the coordinate system of the vehicle in a predetermined cycle. In addition, for example, when the swing body 3 is swung and the yaw angle $\theta 3$ is changed, the construction machine image generation unit 92 generates the construction machine image BG in a predetermined cycle in conjunction with the swing of the swing body 3. Similarly, when at least one of the roll angle $\theta 1$ and the pitch angle $\theta 2$ is changed, the construction machine image generation unit 92 generates the construction machine image BG in a predetermined cycle in conjunction with the change of at least one of the roll angle $\theta 1$ and the pitch angle $\theta 2$. In addition, when the working equipment 4 operates and at least one of the inclination angles $\alpha$, $\beta$, and $\gamma$ is changed, the construction machine image generation unit 92 generates the construction machine image BG in a predetermined cycle in conjunction with the change of at least one of the inclination angles $\alpha$, $\beta$, and $\gamma$.

The synthesis unit 95 synthesizes the object image AG generated by the object image generation unit 91 with the construction machine image BG generated by the construction machine image generation unit 92 to generate the combined image IG. The synthesis unit 95 generates the combined image IG in a predetermined cycle. The combined image IG is an image obtained by overlapping the object image AG and the construction machine image BG.

The display control unit 93 causes the combined image IG to be displayed in the display device 80. The display control unit 93 acquires the combined image IG generated by the synthesis unit 95 from the synthesis unit 95. The display control unit 93 converts the combined image IG into display data with which the display device 80 can display, and outputs the data to the display device 80. With this configuration, the combined image IG is displayed in the display device 80.

The coordinate conversion data memory unit 94 stores coordinate conversion data to convert the position in the global coordinate system, the position in the coordinate system of the vehicle, the position in the coordinate system of the distance detection device, and the position in the coordinate system of the image capture device to each other. The coordinate conversion data includes a coordinate conversion parameter or a coordinate conversion determinant. The relative position between the position Pa in the global coordinate system, the origin PL in the coordinate system of the vehicle, the origin PD in the coordinate system of the distance detection device, and the origin PC in the coordinate system of the image capture device is given data which is derived from the design data or the specification data. Therefore, the coordinate conversion data can be derived in advance on the basis of the given data. The coordinate conversion data memory unit 94 stores the coordinate conversion data derived in advance.

The synthesis unit 95 converts the coordinates of at least one of the object image AG and the construction machine image BG to display the combined image IG in the display device 80 in a predetermined single coordinate system on the basis of the coordinate conversion data stored in the coordinate conversion data memory unit 94. The display control unit 93 causes the combined image IG to be displayed in the display device 80 in a single coordinate system.

The object image generation unit 91 generates the object image AG in the coordinate system of the distance detection device on the basis of the detection data of the distance detection device 20. The construction machine image generation unit 92 generates the construction machine image BG in the coordinate system of the vehicle on the basis of the detection data of the posture detection device 40. The synthesis unit 95 adjusts at least one of the coordinate system of the object image AG and the coordinate system of the construction machine image BG to display the object image AG and the construction machine image BG in a single coordinate system.

For example, in a case where the object image AG and the construction machine image BG defined in the coordinate system of the vehicle are displayed in the display device 80, the synthesis unit 95 converts the object image AG defined in the distance detection coordinate system into the object image AG defined in the coordinate system of the vehicle on the basis of the coordinate conversion data stored in the coordinate conversion data memory unit 94. With this configuration, both the object image AG and the construction machine image BG are defined in the coordinate system of the vehicle. The display control unit 93 causes the combined image IG containing the object image AG and the construction machine image BG defined in the coordinate system of the vehicle to be displayed in the display device 80.

In addition, for example, in a case where the object image AG and the construction machine image BG defined in the global coordinate system are displayed in the display device 80, the synthesis unit 95 converts the object image AG defined in the distance detection coordinate system into the object image AG defined in the global coordinate system on the basis of the coordinate conversion data stored in the coordinate conversion data memory unit 94, and converts the construction machine image BG defined in the coordinate system of the vehicle into the object image AG defined in the global coordinate system. With this configuration, both the object image AG and the construction machine image BG are defined in the global coordinate system. The display control unit 93 causes the combined image IG containing the object image AG and the construction machine image BG defined in the global coordinate system to be displayed in the display device 80.

The display control unit 93 causes the real image RG (actual image) of the object WA captured by the image capture device 50, and the combined image IG containing the object image AG and the construction machine image BG to be displayed simultaneously in the display device 80. In this embodiment, the display control unit 93 causes the combined image IG to be displayed in part of the displays screen which displays the real image RG.

Figure 8:
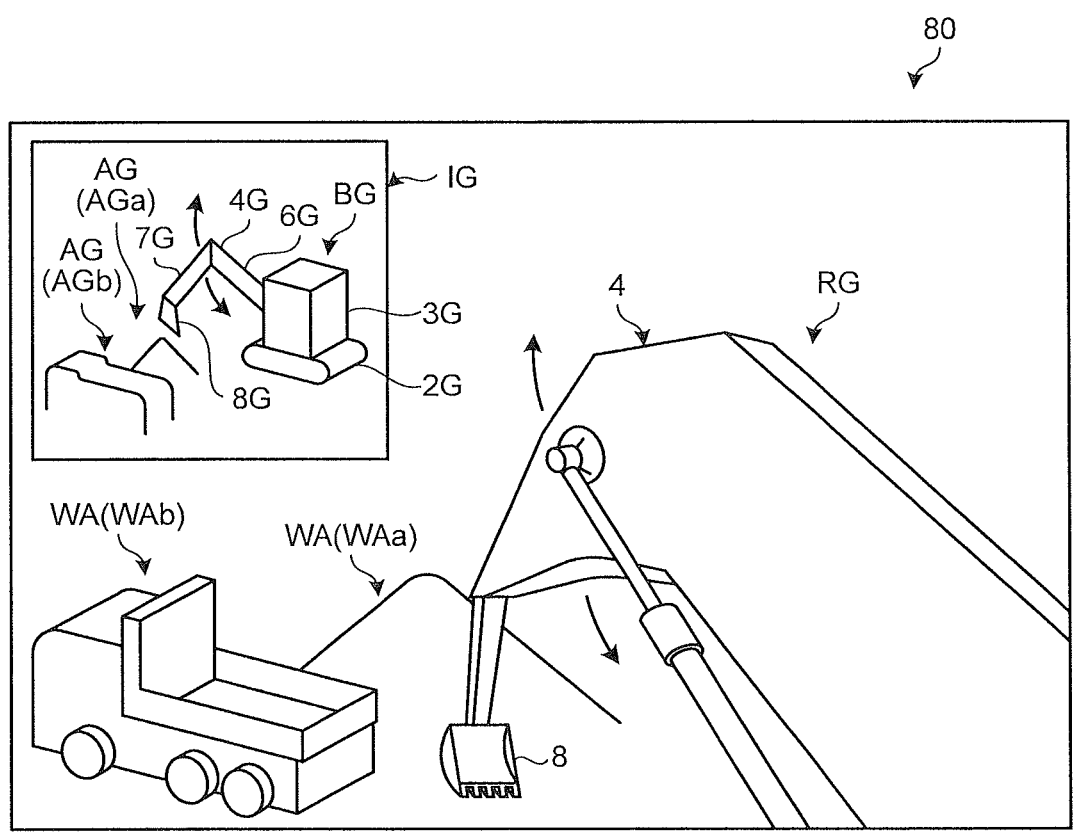
FIG. 8 is a diagram illustrating a displaying example of a display device according to the embodiment.

FIG. 8 is a diagram illustrating an exemplary displaying of the display device 80 according to this embodiment. The image capture device 50 acquires the real image RG (actual image) of the object WA in the front direction of the swing body 3. The display control unit 93 causes the real image RG of the work place acquired by the image capture device 50 to be displayed in the display screen of the display device 80.

The image capture device 50 acquires the real image RG of the object WA in the front direction of the swing body 3. In the capturing of the image capture device 50, at least a part of the working equipment 4 is taken. The real image RG acquired by the image capture device 50 contains the real image of the working equipment 4. In this embodiment, the display screen of the display device 80 displaying the real image RG of the work place contains the real image of the working equipment 4. The real image of the working equipment 4 is displayed in the display screen of the display device 80 where the real image RG of the work place captured by the image capture device 50.

The display control unit 93 causes the combined image IG containing the object image AG and the construction machine image BG to be displayed simultaneously in part of the display screen of the display device 80 where the real image RG of the work place captured by the image capture device 50 is displayed. In other words, the display control unit 93 superimposes the object image AG and the construction machine image BG in part of the display screen of the display device 80 where the real image RG of the work place is displayed. In the following description, the combined image IG superimposed in part of the display screen of the display device 80 will be appropriately called a superimposed image IG.

In the superimposed image IG, the object image AG and the construction machine image BG are displayed to be overlapped.

In this embodiment, the display control unit 93 causes the real image of the working equipment 4 and the superimposed image IG containing the object image AG and the construction machine image BG to be displayed at different positions in the display screen. As illustrated in FIG. 8, in this embodiment, the real image of the working equipment 4 is displayed in the center and the right portion of the display screen of the display device 80. The display control unit 93 causes the superimposed image IG to be displayed at a corner of the display screen of the display device 80 not to make the real image of the working equipment 4 and the superimposed image IG overlapped. In this embodiment, not only the real image of the working equipment 4 but also the real image of the ground (construction target) of the working equipment 4 is displayed in the display screen of the display device 80. Therefore, the display control unit 93 causes the superimposed image IG to be displayed at the left upper corner of the display screen of the display device 80 not to make the real image of the working equipment 4 overlapped with the real image of the ground and the superimposed image IG. Further, the superimposed image IG may be displayed at the right upper corner of the display screen of the display device 80. Since the real image of the working equipment 4 and the real image of the construction target are not hidden by the superimposed image IG, the operator can smoothly work on the construction target using the working equipment 4 while watching the real image.

The virtual viewpoint is set in the obliquely rising direction of the object WA surrounding the excavator 1 and the excavator 1. In this embodiment, there are a ground WAa (construction target) and a transport vehicle WAb as the object WA. The transport vehicle WAb is a dump truck having a loading platform. The excavator 1 excavates the ground WAa (construction target) with the working equipment 4, and stacks the excavated load on the transport vehicle WAb.

In other words, in this embodiment, the object image AG contains an object image AGa indicating the three-dimensional shape of the ground WAa (construction target) overlooked from the virtual viewpoint, and an object image AGb indicating the three-dimensional shape of the transport vehicle WAb overlooked from the virtual viewpoint.

In this embodiment, the construction machine image BG is a skeleton image obtained by simply simulating the excavator 1 overlooked from the virtual viewpoint. The construction machine image BG moves in real time as the posture of the excavator 1 varies. In other words, the construction machine image BG moves in synchronization with the change in posture of the excavator 1. The display control unit 93 can detect the change in posture of the excavator 1 on the basis of the detection data of the posture detection device 40, and moves the construction machine image BG in conjunction with the change in posture of the excavator 1. The construction machine image BG contains a traveling body image 2G (virtual viewpoint image) obtained by simulating the traveling body 2, a swing body image 3G (virtual viewpoint image) obtained by simulating the swing body 3, and working equipment image 4G (virtual viewpoint image) obtained by simulating the working equipment 4. The working equipment image 4G contains a boom image 6G obtained by simulating the boom 6, an arm image 7G obtained by simulating the arm 7, and a bucket image 8G obtained by simulating the bucket 8.

The traveling body image 2G contains a skeleton image simply indicating the appearance of the traveling body 2. The swing body image 3G contains a skeleton image simply indicating the appearance of the swing body 3. The working equipment image 4G contains a skeleton image simply indicating the appearance of the working equipment 4. The construction machine image BG containing the traveling body image 2G, the swing body image 3G, and the working equipment image 4G is a three-dimensional computer graphic. The construction machine image generation unit 92 acquires the skeleton image (three-dimensional CG model) stored in the memory device 90B from the memory device 90B, and generates the construction machine image BG which moves in synchronization with the change in posture of the excavator 1 on the basis of the detection data of the posture detection device 40.

For example, if the swing body 3 of the excavator 1 swings, the swing body posture sensor 41 transmits detection data indicating that the swing body 3 swings to the control device 90 in a predetermined cycle. The construction machine image generation unit 92 makes the swing body image 3G swing in conjunction with the swing of the swing body 3 of the excavator 1. The display control unit 93 causes the swing body image 3G to be displayed in the display device 80 such that the swing body image 3G swings. In addition, if the working equipment 4 of the excavator 1 operates, the working equipment posture sensor 42 transmits the detection data indicating that the working equipment 4 operates to the control device 90. The construction machine image generation unit 92 makes the working equipment image 4G operate in conjunction with the operation of the working equipment 4 of the excavator 1. The display control unit 93 causes the working equipment image 4G to be in the display device 80 such that the working equipment image 4G operates. For example, the display control unit 93 makes the boom image 6G move in conjunction with the change of the inclination angle α, the arm image 7G move in conjunction with the change of the inclination angle β, and the bucket image 8G move in conjunction with the change of the inclination angle γ.

In addition, if a work such as the excavating work or the spreading and grading work is progressed by the excavator 1, the shape of the ground WAa is changed. The shape of the object image AGa is also changed as the shape of the ground WAa is changed. When the shape of the ground WAa is changed, the display control unit 93 changes the shape of the object image AGa in conjunction with the shape of the ground WAa on the basis of the detection data of the distance detection device 20.

In addition, if the load volume stacked in a loading platform of the transport vehicle WAb is changed, or the transport vehicle WAb moves, the shape or the position of the transport vehicle WAb is changed. The shape or the position of the object image AGb is also changed as the shape or the position of the transport vehicle WAb is changed. When the shape or the position of the transport vehicle WAb is changed, the display control unit 93 changes the shape or the position of the object image AGb in conjunction with the change in shape or position of the transport vehicle WAb on the basis of the detection data of the distance detection device 20.

[Display Method]

Figure 9:
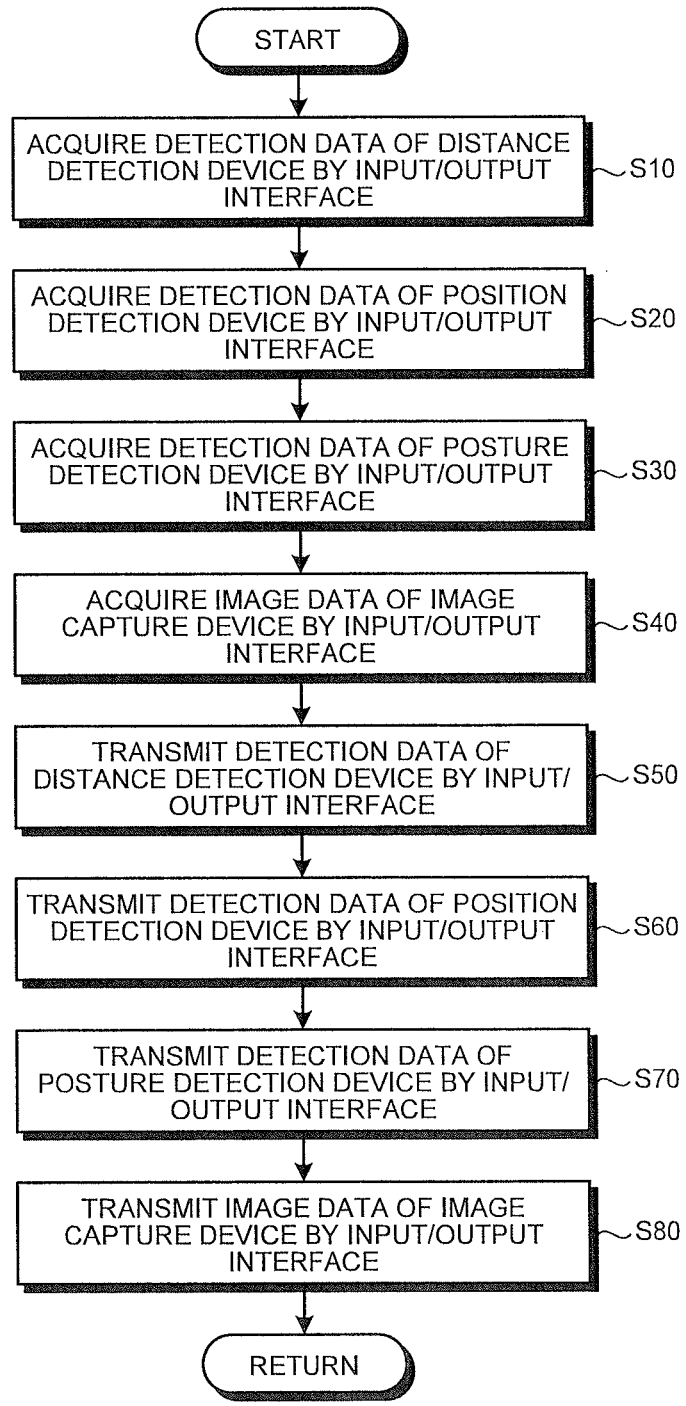
FIG. 9 is a flowchart illustrating an example of a display method according to the embodiment.
Figure 10:
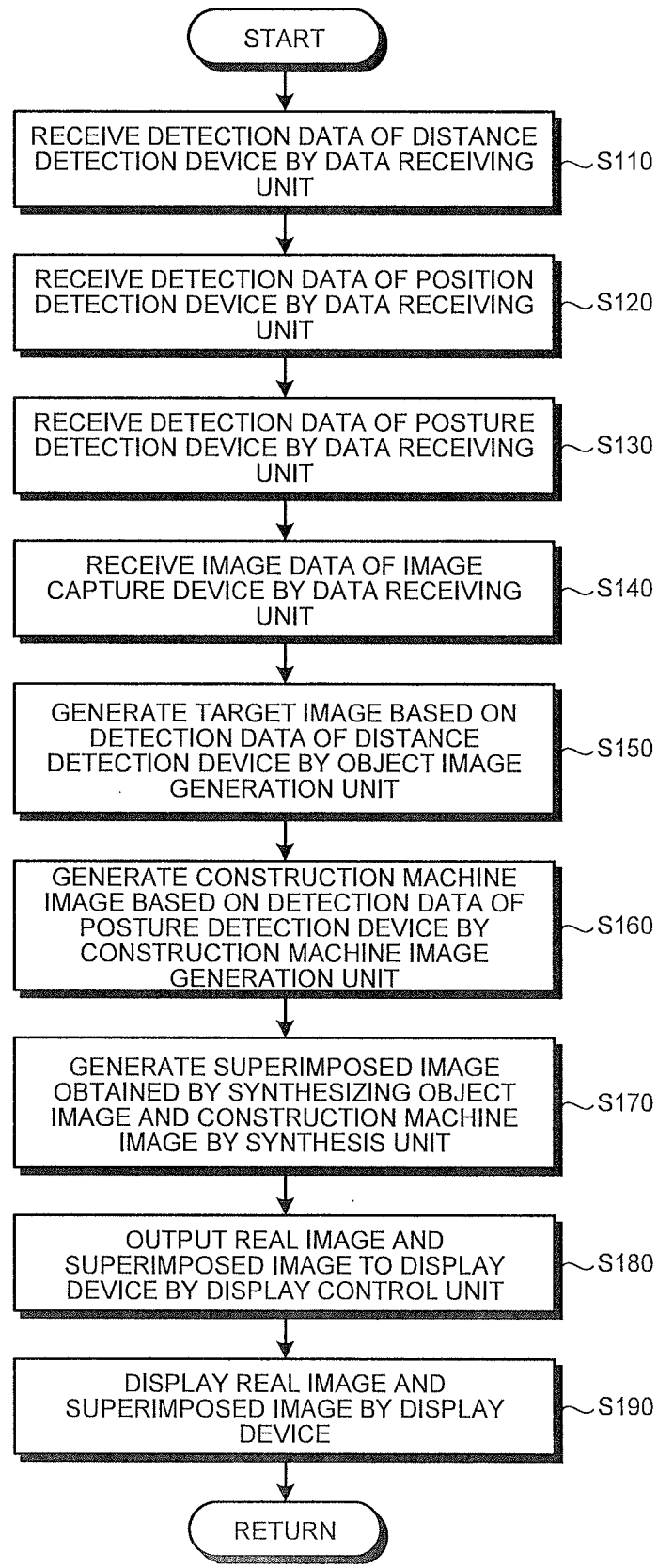
FIG. 10 is a flowchart illustrating an example of the display method according to the embodiment.

FIGS. 9 and 10 are flowcharts illustrating examples of a display method according to this embodiment. FIG. 9 is a flowchart illustrating a process of the control device 60 of the excavator 1. FIG. 10 is a flowchart illustrating a process of the control device 90 of the remote operation system 100. The processes illustrated in FIGS. 9 and 10 are processed in a predetermined cycle.

The process of the control device 60 of the excavator 1 will be described with reference to FIG. 9.

The distance detection device 20 detects the distance Ld to the object WA to detect the three-dimensional shape of the object WA.

In addition, the position detection device 30 detects the position Pa of the swing body 3.

In addition, the posture detection device 40 detects the posture of the excavator 1 which contains the posture of the swing body 3 and the posture of the working equipment 4. The posture of the swing body 3 includes the roll angle θ1, the pitch angle θ2, and the yaw angle θ3. When the swing body 3 is swung, the yaw angle θ3 varies. In a case where the swing body 3 is swung in a state where the traveling body 2 is stopped, the yaw angle θ3 corresponds to the swing angle of the swing body 3. The posture of the working equipment 4 includes the inclination angle α, the inclination angle β, and the inclination angle γ.

In addition, the image capture device 50 acquires the image data indicating the real image RG of the object WA.

The detection data of the distance detection device 20, the detection data of the position detection device 30, the detection data of the posture detection device 40, and the image data of the image capture device 50 are output to the control device 60.

The input/output interface 60C of the control device 60 acquires the detection data of the distance detection device 20 from the distance detection device 20 (Step S10).

In addition, the input/output interface 60C of the control device 60 acquires the detection data of the position detection device 30 from the position detection device 30 (Step S20).

In addition, the input/output interface 60C of the control device 60 acquires the detection data of the posture detection device 40 from the posture detection device 40 (Step S30).

In addition, the input/output interface 60C of the control device 60 acquires the image data of the image capture device 50 from the image capture device 50 (Step S40).

Further, Steps S10, S20, S30, and S40 may be performed in any order, or may be performed simultaneously.

The input/output interface 60C of the control device 60 transmits the detection data of the distance detection device 20 through the communication system 300 to the control device 90 (Step S50).

In addition, the input/output interface 60C of the control device 60 transmits the detection data of the position detection device 30 to the control device 90 through the communication system 300 (Step S60).

In addition, the input/output interface 60C of the control device 60 transmits the detection data of the posture detection device 40 to the control device 90 through the communication system 300 (Step S70).

In addition, the input/output interface 60C of the control device 60 transmits the image data of the image capture device 50 to the control device 90 through the communication system 300 (Step S80).

Further, Steps S50, S60, S70, and S80 may be performed in any order, or may be performed simultaneously.

Next, the process of the control device 90 of the remote operation system 100 will be described with reference to FIG. 10.

The data receiving unit 96 of the control device 90 receives the detection data of the distance detection device 20 through the communication system 300 (Step S110).

In addition, the data receiving unit 96 of the control device 90 receives the detection data of the position detection device 30 through the communication system 300 (Step S120).

In addition, the data receiving unit 96 of the control device 90 receives the detection data of the posture detection device 40 through the communication system 300 (Step S130).

In addition, the data receiving unit 96 of the control device 90 receives the image data of the image capture device 50 through the communication system 300 (Step S140).

Further, Steps S110, S120, S130, and S140 may be performed in any order, or may be performed simultaneously.

The object image generation unit 91 generates the object image AG indicating the virtual viewpoint image of the object WA on the basis of the detection data of the distance detection device 20 (Step S150).

The construction machine image generation unit 92 generates the construction machine image BG indicating the virtual viewpoint image of the excavator 1 on the basis of the detection data of the posture detection device 40 (Step S160).

The synthesis unit 95 synthesizes the object image AG and the construction machine image BG to generate the superimposed image IG (Step S170).

The synthesis unit 95 generates the superimposed image IG in which the object image AG and the construction machine image BG are overlapped. The synthesis unit 95 adjusts the coordinate system of the object image AG and the coordinate system of the construction machine image BG using the coordinate conversion data stored in the coordinate conversion data memory unit 94 such that the object image AG and the construction machine image BG are displayed in a single coordinate system.

The display control unit 93 outputs the real image RG of the object WA captured by the image capture device 50 to the display device 80. In addition, the display control unit 93 acquires the superimposed image IG generated by the synthesis unit 95 from the synthesis unit 95. The display control unit 93 outputs the superimposed image IG containing the object image AG and the construction machine image BG defined in a single coordinate system to the display device 80 (Step S180).

The display device 80 displays the real image RG of the object WA containing the real image of at least the working equipment 4 and the superimposed image IG (Step S190). The display control unit 93 causes the real image of the working equipment 4 and the superimposed image IG to be displayed at different positions in the display screen of the display device 80.

The operator operates the remote operation device 70 while watching the real image RG and the superimposed image IG displayed in the display device 80 to operate the excavator 1 from a remote place. The superimposed image IG is a three-dimensional image of the object WA and the excavator 1 in an overlooking state. Therefore, the operator can feel a perspective sensation between the excavator 1 and the object WA by viewing the superimposed image IG. In this embodiment, the object image AGa indicating the three-dimensional shape of the ground WAa (construction target) is displayed. Therefore, the operator can check the distance between the ground WAa and the working equipment 4 of the excavator 1 by watching the object image AGa and the construction machine image BG. Therefore, the operator can smoothly perform the excavating work or the spreading and grading work. In addition, the object image AGb indicating the three-dimensional shape of the transport vehicle WAb is displayed. Therefore, the operator can check the distance between the transport vehicle WAb and the working equipment 4 of the excavator 1 by watching the object image AGb and the construction machine image BG. Therefore, the operator can smoothly perform the loading work.

Figure 11:
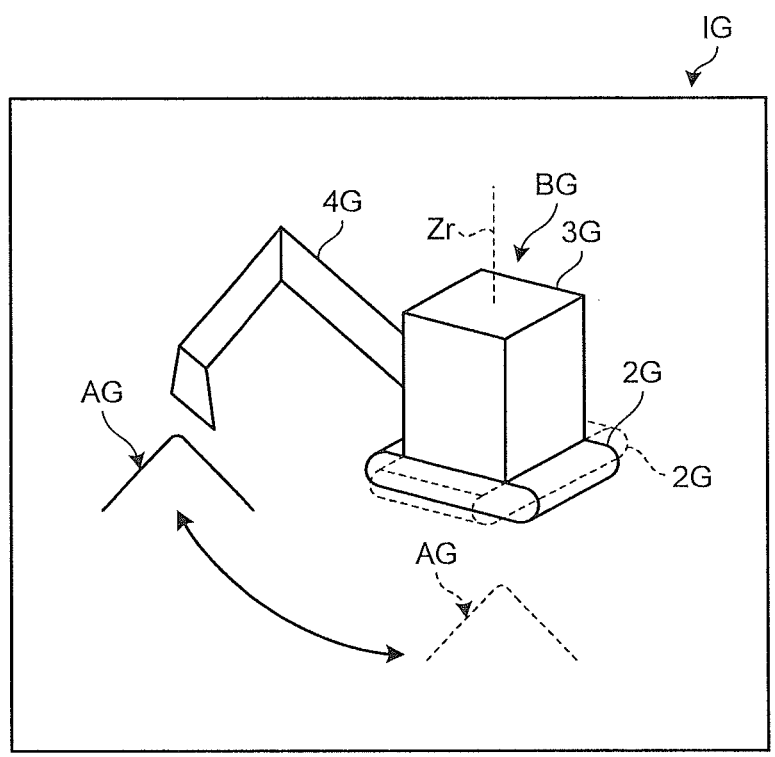
FIG. 11 is a diagram schematically illustrating an example of a superimposed image according to the embodiment.

FIG. 11 is a diagram schematically illustrating an example of the superimposed image IG according to this embodiment. FIG. 11 illustrates the superimposed image IG containing the object image AG and the construction machine image BG defined in the coordinate system of the vehicle. In the example illustrated in FIG. 11, the display control unit 93 causes the object image AG and the construction machine image BG viewed from the virtual viewpoint fixed in the coordinate system of the vehicle to be displayed in the display device 80. The virtual viewpoint is fixed in the coordinate system of the vehicle. Therefore, in a case where the swing body 3 swings in a case where the traveling body 2 of the excavator 1 is stopped, the swing body image 3G is displayed as being stopped and the traveling body image 2G is displayed as being swinging about the swing axis Zr, in the construction machine image BG. In addition, the object image AG is also displayed as being swinging about the swing axis Zr.

Figure 12:
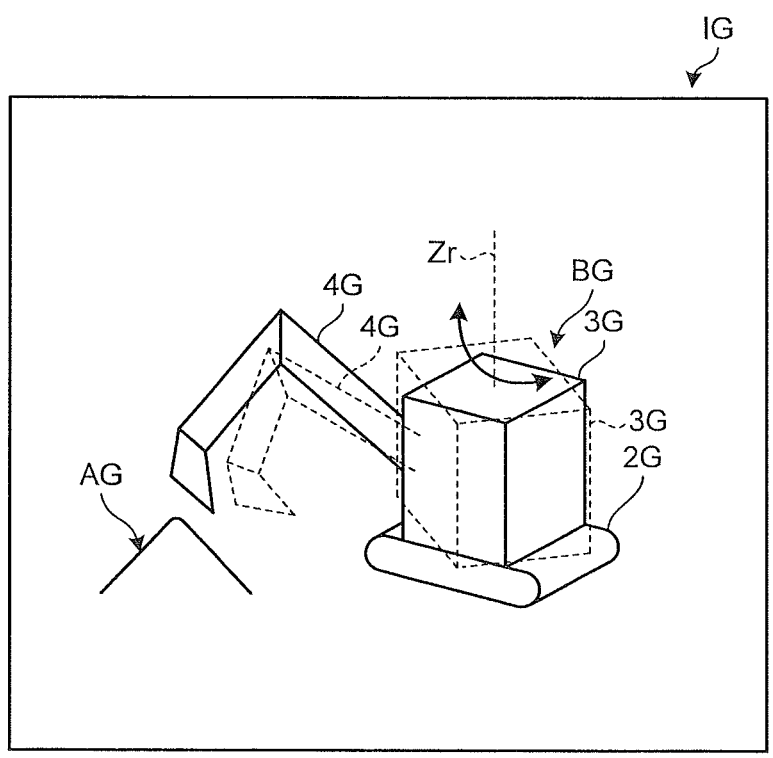
FIG. 12 is a diagram schematically illustrating an example of the superimposed image according to the embodiment.

FIG. 12 is a diagram schematically illustrating an example of the superimposed image IG according to this embodiment. FIG. 12 illustrates the superimposed image IG which contains the object image AG and the construction machine image BG defined in the global coordinate system. In the example illustrated in FIG. 12, the display control unit 93 causes the object image AG and the construction machine image BG viewed from the virtual viewpoint fixed in the global coordinate system to be displayed in the display device 80. The virtual viewpoint is fixed in the global coordinate system. Therefore, in a case where the swing body 3 swings in a state where the traveling body 2 of the excavator 1 is stopped, the traveling body image 2G is displayed as being stopped and the swing body image 3G is displayed as being swinging about the swing axis Zr, in the construction machine image BG. In addition, the object image AG is displayed as being stopped.

[Effects]

As described above, according to this embodiment, the object image AG viewed from the virtual viewpoint of the outside of the excavator 1 is generated on the basis of the detection data of the distance detection device 20. The construction machine image BG viewed from the virtual viewpoint of the outside of the excavator 1 is generated on the basis of the detection data of the posture detection device 40. The object image AG and the construction machine image BG is a three-dimensional computer graphic. The superimposed image IG containing the object image AG and the construction machine image BG is displayed in the display device 80. The operator can feel the perspective sensation of the work place while viewing the object image AG and the construction machine image BG displayed in the display device 80. In a case where the object WA is the ground WAa (construction target), the operator can easily check the distance between the ground WAa (construction target) and the excavator 1. Therefore, the operator operates the remote operation device 70 so as to smoothly work on the construction target by the working equipment 4 of the excavator 1. In addition, in a case where the object WA is the transport vehicle WAb, the operator can easily check the distance between the transport vehicle WAb and the excavator 1, specially the distance between the loading platform of the transport vehicle WAb and the bucket 8 of the excavator 1. Therefore, the operator operates the remote operation device 70, so that the loading work can be smoothly performed on the transport vehicle WAb using the working equipment 4 of the excavator 1. With this configuration, it is possible to lower the workability of the remote operation.

In addition, according to this embodiment, the superimposed image IG is an image obtained by overlapping the object image AG and the construction machine image BG. In addition, in this embodiment, when the traveling body 2, the swing body 3, and the working equipment 4 move, the traveling body image 2G, the swing body image 3G, and the working equipment image 4G move in the superimposed image IG in synchronization. Therefore, when the operator moves at least one of the traveling body 2, the swing body 3, and the working equipment 4, at least one of the traveling body image 2G, the swing body image 3G, and the working equipment image 4G move in the state of overlapping with the object image AG. Therefore, the operator easily feels the perspective sensation between the object WA of the work place and at least one of the traveling body 2, the swing body 3, and the working equipment 4 that is moving by watching the superimposed image IG obtained by overlapping the object image AG and the construction machine image BG.

In addition, according to this embodiment, the distance detection device 20, the posture detection device 40, and the image capture device 50 are mounted in the excavator 1. For example, in a case where the distance detection device is provided in the outside of the excavator 1, the distance detection device is prepared separately, or the installing work of the distance detection device is necessarily performed. In this case, there is a possibility that the cost rises, and the workability is lowered. Since the distance detection device 20 is mounted in the excavator 1, there is no need to mount the distance detection device separately. The installing work of the distance detection device is not necessary. Therefore, it is possible to suppress the cost, and suppress the degradation in the workability. In addition, since the distance detection device 20 is mounted in the excavator 1, there is no need to perform the installing work of the distance detection device even in a case where the position of the object WA (construction target) is gradually changed. The posture detection device 40 and the image capture device 50 are also configured as described above.

In addition, in this embodiment, the superimposed image IG containing the object image AG and the construction machine image BG is displayed in part of the display screen of the display device 80 in which the real image RG captured by the image capture device 50 is contained. With the superimposition of the superimposed image IG in part of the real image RG, the operator can watch the superimposed image IG while watching the real image RG without moving along a large quantity of visual line. Therefore, the operator can feel stable, and can perform a smooth operation.

In addition, in this embodiment, the real image RG where the superimposed image IG is superimposed contains the image of the working equipment 4. In other words, the superimposed image IG is superimposed in the real image RG in the +Xm direction of the swing body 3. The operator can check an operation situation of the working equipment 4 by watching the real image RG, and can check the distance between the object WA and the working equipment 4 by watching the superimposed image IG. In a case where the work is performed using the working equipment 4, the operator operates the remote operation device 70 while watching the real image of the working equipment 4. Therefore, with the superimposition of the superimposed image IG in part of the real image RG containing the real image of the working equipment 4, the operator can watch the superimposed image IG while watching the real image RG without moving along a large quantity of visual line. Therefore, the operator can perform a smooth operation, so that it is possible to suppress the degradation in the workability. In addition, the real image of the working equipment 4 and the superimposed image IG are displayed at different positions in the display screen of the display device 80. With this configuration, the real image of the working equipment 4 is not blocked by the superimposed image IG. Therefore, the operator can watch both the real image of the working equipment 4 and the superimposed image IG smoothly.

In addition, according to this embodiment, the object image AG and the construction machine image BG are displayed in a predetermined single coordinate system. With this configuration, the operator can easily check the distance and the relative position between the object WA and the excavator 1 by watching the object image AG and the construction machine image BG.

In addition, the object image AG and the construction machine image BG are generated in the coordinate system of the vehicle. The object image AG and the construction machine image BG viewed from the virtual viewpoint fixed in the coordinate system of the vehicle are displayed. Therefore, as described with reference to FIG. 11, when the swing body 3 swings, the displaying is made such that the swing body image 3G is stopped and the traveling body image 2G and the object image AG swing. With this configuration, the operator can watch the situation of the work place based on the swing body 3 in an overlooking manner.

In addition, the object image AG and the construction machine image BG are generated in the global coordinate system, and the object image AG and the construction machine image BG viewed from the virtual viewpoint fixed in the global coordinate system are displayed. Therefore, as described with reference to FIG. 12, the displaying is made such that the traveling body image 2G and the object image AG are stopped and the swing body image 3G swings when the swing body 3 swings. With this configuration, the operator can watch the situation of the work place based on the traveling body 2 and the object WA in an overlooking manner.

In addition, according to this embodiment, the construction machine image BG contains the image of the swing body 3 as well as the image of the working equipment 4. Therefore, the operator can check not only the work situation of the working equipment 4 and the distance between the object WA and the working equipment 4 but also the swinging situation of the swing body 3 and the relative position between the object WA and the swing body 3 by watching the object image AG displayed in the display device 80. In addition, with the installation of the swing body posture sensor 41 which detects the posture of the swing body 3 and the working equipment posture sensor 42 which detects the posture of the working equipment 4 are provided, the swing body image 3G is displayed in conjunction with the actual swing of the swing body 3 on the basis of the detection data of the swing body posture sensor 41, and the working equipment image 4G is displayed in conjunction with the actual operation of the working equipment 4 on the basis of the detection data of the working equipment posture sensor 42. With this configuration, the operator can watch the posture and the work situation of the excavator 1 in an overlooking manner.

Further, in the above embodiment, the superimposed image IG may be displayed in a state where the three-dimensional shape of the object image AG and the image captured by the image capture device 50 are overlapped. As described above, the position Pd in the three-dimensional shape of the object WA detected by the distance detection device 20 is converted into the position Pc in the image of the coordinate system of the image capture device. Therefore, the three-dimensional shape of the object WA and the image of the object WA can be overlapped in the coordinate system of the image capture device. In addition, the position Pd in the three-dimensional shape of the object WA and the position Pc in the image of the object WA can be converted to the position Pm of the coordinate system of the vehicle or the position Pg of the global coordinate system.

Further, in the above-described embodiment, the construction machine image BG is described to contain the traveling body image 2G, the swing body image 3G, and the working equipment image 4G. The construction machine image BG may contain the swing body image 3G and the working equipment image 4G, but not the traveling body image 2G. In addition, the construction machine image BG contains the working equipment image 4G, but not the traveling body image 2G and the swing body image 3G.

Further, in the above-described embodiment, the distance detection device 20 is described as the laser range finder. The distance detection device 20 is not limited to the laser range finder. Any device, for example, an ultrasonic distance sensor or a stereo camera, may be used as the distance detection device 20 as long as the device can detect the three-dimensional shape of the object WA.

Further, in the above-described embodiment, the distance detection device 20 may be provided in plural places. In addition, the distance detection device 20 may detect not only the three-dimensional shape of the object WA in the front direction of the swing body 3 but also at least one of the three-dimensional shape of the object WA in the right direction of the swing body 3, the three-dimensional shape of the object WA in the left direction of the swing body 3, and the three-dimensional shape of the object WA in the backward direction of the swing body 3.

Further, in the above-described embodiment, the working equipment posture sensor 42 is described as a stroke sensor. The working equipment posture sensor 42 is not limited to the stroke sensor. Any sensor, for example, a rotary sensor, an acceleration sensor, or an optical sensor such as a laser scanner, may be used as the working equipment posture sensor 42 as long as the sensor can detect the inclination angle of the working equipment 4.

Further, in the above-described embodiment, the image capture device 50 is described as a monocular camera. The image capture device 50 is not limited to a monocular camera. The image capture device 50 may be a stereo camera which has a function of detecting the three-dimensional shape of the object WA and a function of acquiring an image.

Further, in the above-described embodiment, the image capture device 50 may be provided in plural places. In addition, the image capture device 50 may acquire not only the image of the object WA in the front direction of the swing body 3, but also at least one of the image of the object WA in the right direction of the swing body 3, the image of the object WA in the left direction of the swing body 3, and the image of the object WA in the backward direction of the swing body 3.

Further, in the above-described embodiment, the virtual viewpoint may move. In other words, the display control unit 93 may cause the superimposed image IG containing the object image AG and the construction machine image BG viewed from the virtual viewpoints at each of the plurality of positions to be displayed in the display device 80. For example, the superimposed image IG may be a free viewpoint image. The free viewpoint image is an image viewed from a virtual viewpoint set at an arbitrary position with respect to the object (the object WA and the excavator 1).

Further, in the above-described embodiment, the detection data of the distance detection device 20 and the detection data of the posture detection device 40 are transmitted to the control device 90 through the communication system 300, and the object image AG and the working equipment image BG are generated by the control device 90 and displayed in the display device 80. At least one of the object image AG and the construction machine image BG may be generated by the control device 60 mounted in the excavator 1, and at least one of the object image AG and the construction machine image BG may be transmitted to the control device 90 through the communication system 300 and displayed in the display device 80.

Further, in the above-described embodiment, the superimposed image IG is displayed in part of the display screen of the display device 80 which displays the real image RG of the work place. The display device which displays the real image RG and the display device which displays the superimposed image IG may be different. For example, a sub-display device may be disposed near a main display device. The real image RG may be displayed in the main display device, and the superimposed image IG may be displayed in the sub-display device.

Further, in the above-described embodiment, the construction machine 1 is described as the excavator. Any machine may be used as the construction machine 1 as long as the machine includes the working equipment and a swing body to support the working equipment, and not limited to the excavator. In addition, the construction machine 1 may include the working equipment, and the swing body may be not included. For example, the construction machine 1 may be a wheel loader.

REFERENCE SIGNS LIST

1 EXCAVATOR (CONSTRUCTION MACHINE)
2 TRAVELING BODY
2A CRAWLER BELT
2B CRAWLER BELT
3 SWING BODY
4 WORKING EQUIPMENT
5 HYDRAULIC CYLINDER
6 BOOM
7 ARM
8 BUCKET
9 TIP PORTION
10 BOOM CYLINDER
11 ARM CYLINDER
12 BUCKET CYLINDER
20 DISTANCE DETECTION DEVICE
30 POSITION DETECTION DEVICE
31 GPS ANTENNA
40 POSTURE DETECTION DEVICE
41 SWING BODY POSTURE SENSOR
42 WORKING EQUIPMENT POSTURE SENSOR
42A BOOM STROKE SENSOR

42B ARM STROKE SENSOR
42C BUCKET STROKE SENSOR
50 IMAGE CAPTURE DEVICE
60 CONTROL DEVICE
60A ARITHMETIC PROCESSING DEVICE
60B MEMORY DEVICE
60C INPUT/OUTPUT INTERFACE
70 REMOTE OPERATION DEVICE
71 WORKING LEVER
71L LEFT WORKING LEVER
71R RIGHT WORKING LEVER
72 TRAVELING LEVER
72L LEFT TRAVELING LEVER
72R RIGHT TRAVELING LEVER
80 DISPLAY DEVICE
90 CONTROL DEVICE
90A ARITHMETIC PROCESSING DEVICE
90B MEMORY DEVICE
90C INPUT/OUTPUT INTERFACE
91 OBJECT IMAGE GENERATION UNIT
92 CONSTRUCTION MACHINE IMAGE GENERATION UNIT
93 DISPLAY CONTROL UNIT
94 COORDINATE CONVERSION DATA MEMORY UNIT
95 SYNTHESIS UNIT
96 DATA RECEIVING UNIT
100 REMOTE OPERATION SYSTEM
200 DISPLAY SYSTEM
300 COMMUNICATION SYSTEM
AG OBJECT IMAGE
BG CONSTRUCTION MACHINE IMAGE
IG SUPERIMPOSED IMAGE (COMBINED IMAGE)
RG REAL IMAGE
MA DETECTION RANGE
TA CAPTURING RANGE
WA OBJECT
WAa GROUND
WAb TRANSPORT VEHICLE
Zr SWING AXIS

The invention claimed is:

1. A display system, comprising:
an object image generation unit which generates, on the basis of detection data of a distance detection device which is mounted in a construction machine equipped with a traveling body, a swing body, and working equipment and detects a distance to an object around the construction machine, an object image indicating a virtual viewpoint image of the object viewed from a virtual viewpoint of an outside of the construction machine;
a construction machine image generation unit which generates a construction machine image indicating a virtual viewpoint image of the construction machine viewed from the virtual viewpoint on the basis of detection data of a posture detection device which is mounted in the construction machine and detects a posture of the construction machine;
a synthesis unit which generates a combined image obtained by overlapping the object image and the construction machine image; and
a display control unit which causes the combined image to be displayed simultaneously with a real image captured by an image capture device mounted in the construction machine in a partial region of the real image displayed in a display screen of a display device which displays the real image and is located outside of the construction machine,
wherein the display control unit causes the combined image to be displayed in a predetermined coordinate system selected from the group consisting of a coordinate system of a vehicle and a global coordinate system,
whereby when the virtual viewpoint is fixed in the coordinate system of the vehicle and the swing body swings in a state where the traveling body of the construction machine is stopped, a swing body image is displayed as being stopped and a traveling body image is displayed as being swinging about a swing axis of the swing body, in a construction machine image, and the object image is also displayed as being swinging about the swing axis of the swing body, and
whereby when the virtual viewpoint is fixed in the global coordinate system and the swing body swings in a state where the traveling body of the construction machine is stopped, the traveling body image is displayed as being stopped and the swing body image is displayed as being swinging about the swing axis of the swing body, in the construction machine image, and the object image is displayed as being stopped.

2. The display system according to claim 1,
wherein the real image includes a real image of the working equipment, and
wherein the display control unit causes the real image of the working equipment and the combined image to be displayed at different positions in a display screen of the display device.

3. The display system according to claim 1,
wherein the posture detection device includes a swing body posture sensor which detects a posture of a swing body which supports the working equipment and working equipment posture sensor which detects a posture of the working equipment, and
wherein the construction machine image includes an image of the swing body and an image of the working equipment.

4. A display method which is performed by a control device, comprising:
receiving detection data of a distance detection device which is mounted in a construction machine equipped with a traveling body, a swing body, and working equipment and detects a distance to an object around the construction machine;
receiving detection data of a posture detection device which is mounted in the construction machine and detects a posture of the construction machine;
generating an object image indicating a virtual viewpoint image of the object viewed from a virtual viewpoint of an outside of the construction machine on the basis of the detection data of the distance detection device;
generating a construction machine image indicating a virtual viewpoint image of the construction machine viewed from the virtual viewpoint on the basis of the detection data of the posture detection device;
generating a combined image obtained by overlapping the object image and the construction machine image; and
displaying the combined image simultaneously with a real image captured by an image capture device mounted in the construction machine in a partial region of the real image displayed in a display screen of a display device which displays the real image and is located outside of the construction machine, wherein the combined image is displayed in a predetermined coordinate system selected from the group consisting of a coordinate system of a vehicle and a global coordinate system, whereby when the virtual viewpoint is fixed in the coordinate system of the vehicle and the swing body swings in a state where the traveling body of the construction machine is stopped, a swing body image is displayed as being stopped and a traveling body image is displayed as being swinging about a swing axis of the swing body, in a construction machine image, and the object image is also displayed as being swinging about the swing axis of the swing body, and whereby when the virtual viewpoint is fixed in the global coordinate system and the swing body swings in a state where the traveling body of the construction machine is stopped, the traveling body image is displayed as being stopped and the swing body image is displayed as being swinging about the swing axis of the swing body, in the construction machine image, and the object image is displayed as being stopped.

5. A display device which has a display screen that displays
- a real image captured by an image capture device mounted in a construction machine which includes a traveling body, a swing body, and working equipment, and
- a combined image obtained by overlapping an object image indicating a virtual viewpoint image of an object around the construction machine viewed from a virtual viewpoint of an outside of the construction machine and a construction machine image indicating a virtual viewpoint image of the construction machine viewed from the virtual viewpoint, wherein the display device displays the combined image simultaneously with the real image in a partial region of the real image displayed in the display screen, wherein the combined image is displayed in a predetermined coordinate system selected from the group consisting of a coordinate system of a vehicle and a global coordinate system, whereby when the virtual viewpoint is fixed in the coordinate system of the vehicle and the swing body swings in a state where the traveling body of the construction machine is stopped, a swing body image is displayed as being stopped and a traveling body image is displayed as being swinging about a swing axis of the swing body, in a construction machine image, and the object image is also displayed as being swinging about the swing axis of the swing body, and whereby when the virtual viewpoint is fixed in the global coordinate system and the swing body swings in a state where the traveling body of the construction machine is stopped, the traveling body image is displayed as being stopped and the swing body image is displayed as being swinging about the swing axis of the swing body, in the construction machine image, and the object image is displayed as being stopped.

* * * * *